(12) United States Patent
Shen et al.

(10) Patent No.: US 11,102,417 B2
(45) Date of Patent: Aug. 24, 2021

(54) TARGET OBJECT CAPTURING METHOD AND DEVICE, AND VIDEO MONITORING DEVICE

(71) Applicant: Hangzhou Hikvision Digital Technology Co., Ltd., Zhejiang (CN)

(72) Inventors: Lin Shen, Zhejiang (CN); Linjie Shen, Zhejiang (CN); Shangdi Zhang, Zhejiang (CN)

(73) Assignee: Hangzhou Hikvision Digital Technology Co., Ltd., Zhejiang (CN)

(*) Notice: Subject to any disclaimer, the term of this patent is extended or adjusted under 35 U.S.C. 154(b) by 24 days.

(21) Appl. No.: 16/622,568

(22) PCT Filed: Jun. 13, 2018

(86) PCT No.: PCT/CN2018/090987
§ 371 (c)(1),
(2) Date: Dec. 13, 2019

(87) PCT Pub. No.: WO2018/228410
PCT Pub. Date: Dec. 20, 2018

(65) Prior Publication Data
US 2020/0228720 A1 Jul. 16, 2020

(30) Foreign Application Priority Data
Jun. 16, 2017 (CN) .......................... 201710459273.6

(51) Int. Cl.
*H04N 5/232* (2006.01)
*G06T 7/70* (2017.01)
(Continued)

(52) U.S. Cl.
CPC ........... *H04N 5/23299* (2018.08); *G06T 7/20* (2013.01); *G06T 7/70* (2017.01); *H04N 5/23238* (2013.01);
(Continued)

(58) Field of Classification Search
None
See application file for complete search history.

(56) References Cited

U.S. PATENT DOCUMENTS

2011/0310219 A1* 12/2011 Kim ...................... H04N 5/247
348/36
2012/0038776 A1 2/2012 Ahiska et al.
(Continued)

FOREIGN PATENT DOCUMENTS

CN 101969548 A 2/2011
CN 103105858 A 5/2013
(Continued)

*Primary Examiner* — Lindsay J Uhl
(74) *Attorney, Agent, or Firm* — Bret E. Field; Bozicevic, Field & Francis LLP

(57) ABSTRACT

Embodiments of the present application provide a method, apparatus and video monitoring device for capturing a target object. The method comprises detecting target objects in current panoramic video frame acquired by panoramic camera, and determining first position information, size, moving direction, and speed information of each target object in the current panoramic video frame; calculating position information for capturing of each target object; determining detail camera position information corresponding to each target object and determining a magnification corresponding to each target object according to size thereof; and determining a tracking duration for each target object, and controlling, for each target object, the detail camera to adjust its position and magnification according to the detail camera position information and magnification corresponding to the target object, and controlling the adjusted detail camera to capture the target object within the tracking duration for the target object. Embodiments of the present application can improve the quality of capturing of a target object while ensuring the monitoring range.

20 Claims, 4 Drawing Sheets

(51) Int. Cl.
*G06T 7/20* (2017.01)
*H04N 7/18* (2006.01)

(52) U.S. Cl.
CPC ........... *H04N 5/23296* (2013.01); *H04N 7/18* (2013.01); *G06T 2207/30232* (2013.01); *G06T 2207/30244* (2013.01)

(56) References Cited

U.S. PATENT DOCUMENTS

2012/0327246 A1   12/2012  Senior et al.
2014/0139680 A1    5/2014  Huang et al.

FOREIGN PATENT DOCUMENTS

| | | |
|---|---|---|
| CN | 103297696 A | 9/2013 |
| CN | 104125433 A | 10/2014 |
| CN | 106791715 A | 5/2017 |
| KR | 10-0716306 B1 | 5/2007 |
| WO | WO2014043975 A1 | 3/2014 |
| WO | WO2014043976 A1 | 3/2014 |

\* cited by examiner

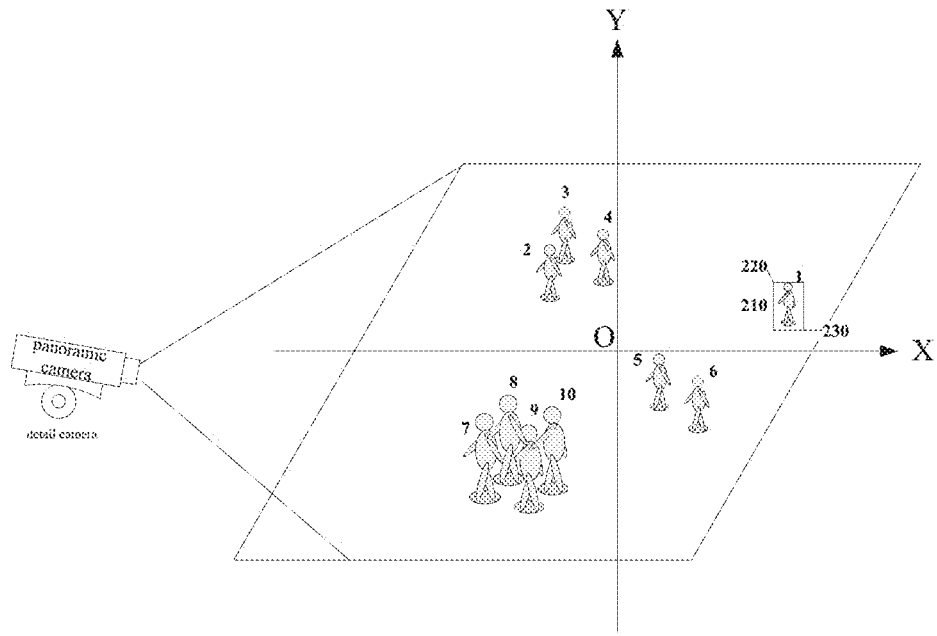

Fig. 3 performing block processing on the target objects according to the detail camera position information and magnifications corresponding to the target objects to obtain at least one target block, wherein, each target block contains one or more target objects — S401 determining a tracking duration for each target block; for each target block, identifying, from target objects contained in the target block, second target objects at edge positions; and determining detail camera position information corresponding to the target block according to the detail camera position information corresponding to the second target objects, and determining a magnification corresponding to the target block according to magnifications corresponding to the second target objects — S402 for each target block, controlling the detail camera to adjust its position and magnification according to the detail camera position information and magnification corresponding to the target block, and controlling the adjusted detail camera to capture the target block within the tracking duration for the target block — S403

Fig. 4

TARGET OBJECT CAPTURING METHOD AND DEVICE, AND VIDEO MONITORING DEVICE

The present application claims the priority to Chinese patent application No. 201710459273.6 filed with the China National Intellectual Property Administration on Jun. 16, 2017 and entitled "Target Object Capturing Method and Device, and Video Monitoring Device", which is incorporated herein by reference in its entirety.

TECHNICAL FIELD

The present application relates to the field of image processing technology, and in particular, to a method, apparatus, and video monitoring device for capturing a target object.

BACKGROUND

With the continuous development of video monitoring technology, video monitoring devices have been widely used in the field of security. In a monitoring scene, a monitoring device is typically required to he able to monitor a wide-range scene and capture a high-definition monitoring image.

However, when using a panoramic camera with a large monitoring range (such as a gun machine) for monitoring, a target object in the monitoring image is usually small, resulting in a problem such as unclear details of the target object. When a detail camera (such as a dome camera) is used for monitoring, a clear target object can usually be obtained in the monitoring image, but the monitoring range is often smaller. Therefore, the existing video monitoring device has a problem that the monitoring range and the definition of the target object cannot both be obtained.

SUMMARY

Embodiments of the present application provide a method and apparatus for capturing a target object and a video monitoring device, to improve the quality of a captured target object while ensuring a monitoring range. The following specific technical solutions are provided.

In a first aspect, an embodiment of the present application provides a method for capturing a target object, including:

detecting target objects in a current panoramic video frame acquired by a panoramic camera, and determining first position information, a size, a moving direction, and speed information of each of the target objects in the current panoramic video frame;

calculating position information for capturing of each of the target objects according to the first position information, moving direction and speed information of the target object, and a preset period for position adjustment of a detail camera;

determining detail camera position information corresponding to each of the target objects according to the position information for capturing of the target object and pre-established position correspondences between the panoramic camera and the detail camera, and determining a magnification corresponding to each of the target objects according to the size of the target object; and determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object.

Optionally, calculating position information for capturing of each of the target objects according to the first position information, moving direction and speed information of the target object, and a preset period for position adjustment of a detail camera includes:

determining position change information of each of the target objects according to the speed information and moving direction of the target object, and the preset period for position adjustment of the detail camera; and determining the position information for capturing of each of the target objects according to the first position information of the target object and corresponding position change information.

Optionally, determining a magnification corresponding to each of the target objects according to the size of the target object includes:

determining an angle of view for each of the target objects according to the size of the target object;

determining a magnification corresponding to the angle of view according to preset correspondences between magnifications and angles of view, and using the determined magnification as the magnification corresponding to the target object.

Optionally, determining a tracking duration for each of the target objects includes:

determining a distance of each of the target objects from a monitoring scene edge according to the moving direction of the target object, and calculating a departure time of each of the target objects according to the distance of the target object from the monitoring scene edge and the speed information of the target object; and calculating the tracking duration for each of the target objects according to the departure time of the target object and a preset condition; wherein, the preset condition include: a sum of the tracking durations for the target objects being less than the departure time of any of the target objects, and having a maximum value, and the tracking durations for the target objects having a minimum variance.

Optionally, before controlling, for each of the target objects, the detail camera to adjust its position and magnification according to the detail camera position information and magnification corresponding to the target object, and controlling the adjusted detail camera to capture the target object within the tracking duration for the target object, the method further includes:

determining a capturing priority of each of the target objects according to an ascending order of the departure time of the target objects;

controlling, for each of the target objects, the detail camera to adjust its position and magnification according to the detail camera position information and magnification corresponding to the target object, and controlling the adjusted detail camera to capture the target object within the tracking duration for the target object includes:

for each of the target objects, controlling, in a descending order of the priorities, the detail camera to adjust its position and magnification according to the detail camera position information and the magnification corresponding to the target object, and controlling the adjusted detail camera to capture the target object within the tracking duration for the target object.

Optionally determining a tracking duration for each of the target objects includes:

obtaining a preset tracking duration, and taking the obtained tracking duration as the tracking duration for the target object.

Optionally, before calculating position information for capturing of each of the target objects according to the first position information, moving direction and speed information of the target object, and a preset period for position adjustment of a detail camera, the method further includes:

identifying, among the target objects, first target objects moving directly toward the panoramic camera;

correspondingly, the steps of:

calculating position information for capturing of each of the target objects according to the first position information, moving direction and speed information of the target object, and a preset period for position adjustment of a detail camera;

determining detail camera position information corresponding to each of the target objects according to the position information for capturing of the target object and pre-established position correspondences between the panoramic camera and the detail camera, and determining a magnification corresponding to each of the target objects according to the size of the target object; and determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object include:

calculating position information for capturing of each of the first target objects according to first position information, a moving direction and speed information of the first target object, and a preset period for position adjustment of the detail camera;

determining detail camera position information corresponding to each of the first target objects according to the position information for capturing of the first target object and the pre-established position correspondences between the panoramic camera and the detail camera; and determining a magnification corresponding to each of the first target objects according to the size of the first target object; and determining a tracking duration for each of the first target objects, and controlling, for each of the first target objects, the detail camera to adjust its position and magnification according to the detail camera position information and magnification corresponding to the first target object, and controlling the adjusted detail camera to capture the first target object within the tracking duration for the target object.

Optionally, the method further includes:

obtaining, for any of the target objects, multiple images of the target object captured by the detail camera; and identifying and storing N images with the best image quality among the multiple images, where N is an integer greater than 0.

Optionally, determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object includes:

performing block processing on the target objects according to the detail camera position information and magnifications corresponding to the target objects to obtain at least one target block, wherein, each target block contains one or more target objects;

determining a tracking duration for each target block; for each target block, identifying, from target objects contained in the target block, second target objects at edge positions; and determining detail camera position information corresponding to the target block according to the detail camera position information corresponding to the second target objects, and determining a magnification corresponding to the target block according to magnifications corresponding to the second target objects; and for each target block, controlling the detail camera to adjust its position and magnification according to the detail camera position information and magnification corresponding to the target block, and controlling the adjusted detail camera to capture the target block within the tracking duration for the target block.

Optionally, determining a tracking duration for each target block includes:

determining, for each target block, third target objects with the same moving direction and of the largest amount according to moving directions of target objects contained in the target block, and determining a distance of the target block from the monitoring scene edge according to the moving directions of the third target objects;

calculating a departure time for the target block according to the distance of the target block from the monitoring scene edge and an average speed of the third target objects contained in the target block; and calculating a tracking duration of the target block according to the departure time of the target block and a preset condition; wherein the preset condition includes: the sum of the tracking durations of the target blocks being less than the departure time of any of the target blocks, and having a maximum value, and the tracking durations of the target blocks having a minimum variance.

Optionally, determining a magnification corresponding to the target block according to magnifications corresponding to the second target objects includes:

using a maximum value in the magnifications corresponding to the second target objects as the magnification corresponding to the target block, or using a comprehensive magnification obtained by multiplying the magnification of each of the second target objects by a corresponding weight as the magnification corresponding to the target block.

Optionally detecting the target objects in a current panoramic video frame captured by a panoramic camera includes:

detecting target objects that are in the current panoramic video frame but are not in a previous panoramic video frame captured by the panoramic camera.

In a second aspect, an embodiment of the present application provides an apparatus for capturing a target object, including:

a detecting module, configured for detecting target objects in a current panoramic video frame acquired by a panoramic camera, and determining first position information, a size, a moving direction, and speed information of each of the target objects in the current panoramic video frame;

a calculating module, configured for calculating position information for capturing of each of the target objects according to the first position information, moving direction and speed information of the target object, and a preset period for position adjustment of a detail camera;

a first determining module, configured for determining detail camera position information corresponding to each of the target objects according to the position information for capturing of the target object and pre-established position correspondences between the panoramic camera and the detail camera, and determining a magnification corresponding to each of the target objects according to the size of the target object; and a control module, configured for determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object.

Optionally, the calculating module includes:

a first determining sub-module, configured for determining position change information of each of the target objects according to the speed information and moving direction of the target object, and the preset period for position adjustment of the detail camera; and a second determining sub-module, configured for determining the position information for capturing of each of the target objects according to the first position information of the target object and corresponding position change information.

Optionally, the calculating module includes:

a third determining sub-module, configured for determining an angle of view for each of the target objects according to the size of the target object;

a fourth determining sub-module, configured for determining a magnification corresponding to the angle of view according to preset correspondences between magnifications and angles of view, and using the determined magnification as the magnification corresponding to the target object.

Optionally, the control module includes:

a first calculating sub-module, configured for determining a distance of each of the target objects from a monitoring scene edge according to the moving direction of the target object, and calculating a departure time of each of the target objects according to the distance of the target object from the monitoring scene edge and the speed information of the target object;

a second calculating sub-module, configured calculating the tracking duration for each of the target objects according to the departure time of the target object and a preset condition; wherein, the preset condition include: a sum of the tracking durations for the target objects being less than the departure time of any of the target objects and having a maximum value, and the tracking durations for the target objects having a minimum variance.

Optionally, the apparatus further includes:

a second determining module, configured for determining a capturing priority of each of the target objects according to an ascending order of the departure time of the target objects;

the control module is further configured for, for each of the target objects, controlling, in a descending order of the priorities, the detail camera to adjust its position and magnification according to the detail camera position information and the magnification corresponding to the target object, and controlling the adjusted detail camera to capture the target object within the tracking duration for the target object.

Optionally, the control module is further configured for obtaining a preset tracking duration, and taking the obtained tracking duration as the tracking duration for the target object.

Optionally, the apparatus further includes:

an identifying module, configured for identifying, among the target objects, first target objects moving directly toward the panoramic camera;

correspondingly, the calculating module is configured for calculating position information for capturing of each of the first target objects according to first position information, a moving direction and speed information of the first target object, and a preset period for position adjustment of the detail camera;

the first determining module is configured for determining detail camera position information corresponding to each of the first target objects according to the position information for capturing of the first target object and the pre-established position correspondences between the panoramic camera and the detail camera; and determining a magnification corresponding to each of the first target objects according to the size of the first target object;

the control module is configured for determining a tracking duration for each of the first target objects, and controlling, for each of the first target objects, the detail camera to adjust its position and magnification according to the detail camera position information and magnification corresponding to the first target object, and controlling the adjusted detail camera to capture the first target object within the tracking duration for the first target object.

Optionally, the apparatus further includes:

an obtaining module, configured for obtaining, for any of the target objects, multiple images of the target object captured by the detail camera; and a storage module, configured for identifying and storing N images with the best image quality among the multiple images, where N is an integer greater than 0.

Optionally, the control module includes:

a blocking sub-module, configured for performing block processing on the target objects according to the detail camera position information and magnifications corresponding to the target objects to obtain at least one target block, wherein, each target block contains one or more target objects;

a fifth determining sub-module, configured for determining a tracking duration for each target block; for each target block, identifying, from target objects contained in the target block, second target objects at edge positions; and determining detail camera position information corresponding to the target block according to the detail camera position information corresponding to the second target objects, and determining a magnification corresponding to the target block according to magnifications corresponding to the second target objects; and a control sub-module, configured for, for each target block, controlling the detail camera to adjust its position and magnification according to the detail camera position information and magnification corresponding to the target block, and controlling the adjusted detail camera to capture the target block within the tracking duration for the target block.

Optionally, the fifth determining sub-module includes:

a determining subunit, configured for determining, for each target block, third target objects with the same moving direction and of the largest amount according to moving directions of target objects contained in the target block, and determining a distance of the target block from the monitoring scene edge according to the moving directions of the third target objects;

a first calculating subunit, configured for calculating a departure time for the target block according to the distance of the target block from the monitoring scene edge and an average speed of the third target objects contained in the target block; and a second calculating subunit, configured for calculating a tracking duration of the target block according to the departure time of the target block and a preset condition; wherein the preset condition includes: the sum of the tracking durations of the target blocks being less than the departure time of any of the target blocks, and having a maximum value, and the tracking durations of the target blocks having a minimum variance.

Optionally, the fifth determining sub-module is further configured for using a maximum value in the magnifications corresponding to the second target objects as the magnification corresponding to the target block, or using a comprehensive magnification obtained by multiplying the magnification of each of the second target objects by a corresponding weight as the magnification corresponding to the target block.

Optionally, the detecting module is further configured for detecting target objects that are in the current panoramic video frame but are not in a previous panoramic video frame captured by the panoramic camera.

In a third aspect, an embodiment of the present application provides a video monitoring device, including a panoramic camera, a processor, and a detail camera;

the panoramic camera is configured for capturing a current panoramic video frame and send the current panoramic video frame to the processor;

the processor is configured for detecting target objects in the current panoramic video frame acquired by the panoramic camera, and determining first position information, a size, a moving direction, and speed information of each of the target objects in the current panoramic video frame; calculating position information for capturing of each of the target objects according to the first position information, moving direction and speed information of the target object, and a preset period for position adjustment of the detail camera; determining detail camera position information corresponding to each of the target objects according to the position information for capturing of the target object and pre-established position correspondences between the panoramic camera and the detail camera, and determining a magnification corresponding to each of the target objects according to the size of the target object; determining a tracking duration for each of the target objects; and for each of the target objects, sending the detail camera position information and magnification corresponding to the target object to the detail camera; and the detail camera is configured for adjusting its position and magnification according to received detail camera position information and magnification corresponding to the target object, and capturing the target object within the tracking duration for the target object.

Optionally, the processor is further configured for determining position change information of each of the target objects according to the speed information and moving direction of the target object, and the preset period for position adjustment of the detail camera; and determining the position information for capturing of each of the target objects according to the first position information of the target object and corresponding position change information.

Optionally, the processor is further configured for determining an angle of view for each of the target objects according to the size of the target object; and determining a magnification corresponding to the angle of view according to preset correspondences between magnifications and angles of view, and using the determined magnification as the magnification corresponding to the target object.

Optionally, the processor is further configured for determining a distance of each of the target objects from a monitoring scene edge according to the moving direction of the target object, and calculating a departure time of each of the target objects according to the distance of the target object from the monitoring scene edge and the speed information of the target object; and calculating the tracking duration for each of the target objects according to the departure time of the target object and a preset condition; wherein, the preset condition include: a sum of the tracking durations for the target objects being less than the departure time of any of the target objects and having a maximum value, and the tracking durations for the target objects having a minimum variance.

Optionally, the processor is further configured for before controlling, for each of the target objects, the detail camera to adjust its position and magnification according to the detail camera position information and magnification corresponding to the target object, and controlling the adjusted detail camera to capture the target object within the tracking duration for the target object, determining a capturing priority of each of the target objects according to an ascending order of the departure time of the target objects; and for each of the target objects, sending, in a descending order of the priorities, the detail camera position information and magnification corresponding to the target object to the detail camera;

the detail camera is further configured for adjusting its position and magnification according to the received detail camera position information and magnification corresponding to the target object and capturing the target object within the tracking duration for the target object.

Optionally, the processor is further configured for, before calculating position information for capturing of each of the target objects according to the first position information, moving direction and speed information of the target object, and a preset period for position adjustment of a detail camera, identifying, among the target objects, first target objects moving directly toward the panoramic camera; and the processor is further configured for: calculating position information for capturing of each of the first target objects according to first position information, a moving direction and speed information of the first target object, and a preset period for position adjustment of the detail camera; determining detail camera position information corresponding to each of the first target objects according to the position information for capturing of the first target object and the pre-established position correspondences between the panoramic camera and the detail camera; and determining a magnification corresponding to each of the first target objects according to the size of the first target object; determining a tracking duration for each of the first target objects, and sending the detail camera position information and magnification corresponding to the first target object to the detail camera the detail camera is configured for adjusting its position and magnification according to received detail camera position information and magnification corresponding to the first target object, and capturing the first target object within the tracking duration for the target object.

Optionally, the processor is further configured for obtaining, for any target object, multiple images corresponding to the target object captured by the detail camera; identifying and store N images with the best image quality among the multiple images, where N is an integer greater than 0.

Optionally, the processor is specifically configured for the processor is further configured for performing block processing on the target objects according to the detail camera position information and magnifications corresponding to the target objects to obtain at least one target block, wherein, each target block contains one or more target objects;

determining a tracking duration for each target block; for each target block, identifying, from target objects contained in the target block, second target objects at edge positions; and determining detail camera position information corresponding to the target block according to the detail camera position information corresponding to the second target objects, and determining a magnification corresponding to the target block according to magnifications corresponding to the second target objects; and sending the detail camera position information and magnification corresponding to each target block to the detail camera;

the detail camera is further configured for, for each target block, adjusting its position and magnification according to received detail camera position information and magnification corresponding to the target block, and capturing the target block within the tracking duration for the target block.

Optionally, the processor is further configured for , the processor is further configured for determining, for each target block, third target objects with the same moving direction and of the largest amount according to moving directions of target objects contained in the target block, and determining a distance of the target block from the monitoring scene edge according to the moving directions of the third target objects; calculating a departure time for the target block according to the distance of the target block from the monitoring scene edge and an average speed of the third target objects contained in the target block; and calculating a tracking duration of the target block according to the departure time of the target block and a preset condition; wherein the preset condition includes: the sum of the tracking durations of the target blocks being less than the departure time of any of the target blocks, and having a maximum value, and the tracking durations of the target blocks having a minimum variance.

Optionally, the processor is further configured for the processor is further configured for using a maximum value in the magnifications corresponding to the second target objects as the magnification corresponding to the target block, or using a comprehensive magnification obtained by multiplying the magnification of each of the second target objects by a corresponding weight as the magnification corresponding to the target block.

Optionally, the processor is further configured for detecting target objects that are present in the current panoramic video frame but are not present in a previous panoramic video frame captured by the panoramic camera.

In a fourth aspect, the present application provides a storage medium having executable program stored thereon which, when executed, performs the method for capturing a target object according to the first aspect.

In a fifth aspect, the present application provides an application program which, when executed, performs the method for capturing a target object according to the first aspect.

The embodiments of the present application provide a method, apparatus and video monitoring device for capturing a target object, the method includes: detecting target objects in a current panoramic video frame acquired by a panoramic camera, and determining first position information, a size, a moving direction, and speed information of each of the target objects in the current panoramic video frame; calculating position information for capturing of each of the target objects according to the first position information, moving direction and speed information of the target object, and a preset period for position adjustment of a detail camera; determining detail camera position information corresponding to each of the target objects according to the position information for capturing of the target object and pre-established position correspondences between the panoramic camera and the detail camera, and determining a magnification corresponding to each of the target objects according to the size of the target object; and determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object.

In the embodiment of the present application, when a target object is detected in the panoramic camera, the detail camera can adjust to capture the target object by using the position and magnification corresponding to each target object according to the specific position information, size, movement direction, and speed information of each target object and can capture each target object for multiple times within capturing duration for each target object, thereby improving the quality of the captured target object while ensuring the monitoring range.

BRIEF DESCRIPTION OF THE DRAWINGS

In order to illustrate the technical solutions of the embodiments of the present application and the related art more clearly, the drawings used in the embodiments and the related art will be briefly described below. It is obvious that the drawings in the following description are only for some embodiments of the present application, other drawings may be acquired from those of ordinary skill in the art without any creative effort based on these drawings.

FIG. 3 is a schematic diagram of target object position information in a panoramic video frame according to an embodiment of the present application;

FIG. 4 is another flowchart of a method for capturing a target object according to an embodiment of the present application;

DETAILED DESCRIPTION OF THE INVENTION

The technical solutions of the embodiments of the present application will be described clearly and completely in combination of the accompanying drawings of the embodiments of the present application. It is apparent that the described embodiments are only a part of the embodiments of the present application, and not all of them. All other embodiments obtained by a person of ordinary skill in the art based on the embodiments of the present application without any creative effort fall within the protection scope of the present application.

The present application is described in detail below through specific embodiments.

Figure 1:
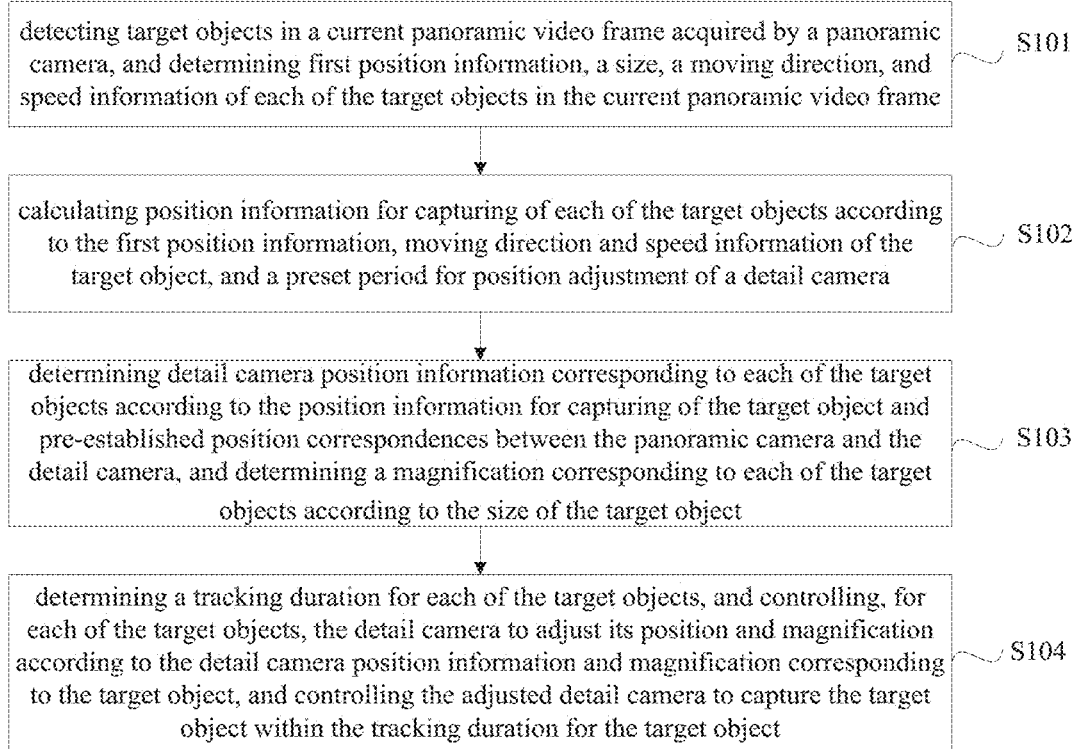
FIG. 1 is a flowchart of a method for capturing a target object according to an embodiment of the present application.

Referring to FIG. 1 which illustrates a flowchart of a method for shooting a target object according to an embodiment of the present application. The method may include the following steps:

S101, detecting target objects in a current panoramic video frame acquired by a panoramic camera, and determining first position information, a size, a moving direction, and speed information of each of the target objects in the current panoramic video frame.

The method provided in the embodiment of the present application is applicable to a video monitoring device. Specifically, the video monitoring device in the embodiment of the present application may include at least a panoramic camera, a detail camera, and a processor. The panoramic camera may be a camera with a large monitoring range, such as a gun camera, a fish-eye camera, or the like. The detail camera may be a camera capable of adjusting capturing magnification, such as a ball camera. In addition, the position of the detail camera may be adjusted. As such, monitoring range and size of the target object in a captured image may be adjusted.

In the embodiment of the present application, the panoramic camera may acquire panoramic video frames. For example, the panoramic camera can periodically acquire panoramic video frames at preset time intervals. In addition, the panoramic camera can send acquired current panoramic video frame to the processor.

After receiving a current panoramic video frame sent by the panoramic camera, the processor may detect target objects in the current panoramic video frame. For example, the processor may use a target detection algorithm such as Deformable Parts Model (DPM) or Faster Region Convolutional Neural Network (FRCNN) to detect target objects in the current panoramic video frame. The target objects may be a person or a vehicle. In the embodiment of the present application, the method for capturing a target object according to the embodiment of the present application is described, by way of example, with reference to target objects of persons.

Figure 2:
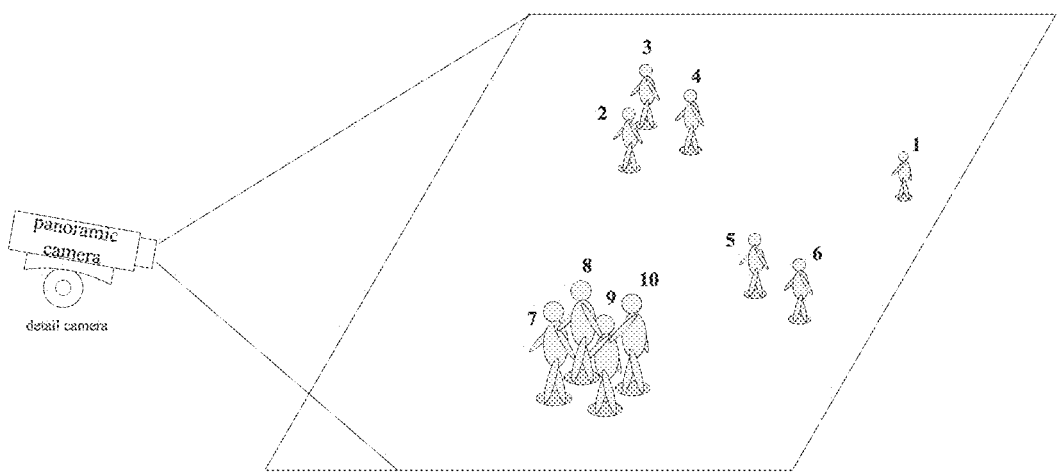
FIG. 2 is a schematic diagram of a panoramic video frame according to an embodiment of the present application.

Referring to FIG. 2 which illustrates a schematic diagram of a current panoramic video frame acquired by a panoramic camera. As shown in FIG. 2, the current panoramic video frame acquired by the panoramic camera contains target objects 1, 2, 3, 4, 5, 6,7,8, 9, and 10.

After detecting target objects, the processor may also determine first position information, a size, a moving direction, and speed information of each of the target objects in the current panoramic video frame. For example, the processor may determine a rectangular region containing a target object, and determine coordinates for the upper left vertex and lower right vertex of the rectangular region in a preset coordinate system as the first position of the target object. Correspondingly, the processor may determine the size of the containing rectangular area as the size of the target object.

As shown in FIG. 3, the target object 1 is determined to be in a rectangular area 210, and the first position information of the target object 1 may be coordinates for the upper left vertex 220 and the lower right vertex 230 of the area 210 in a constructed coordinate system as shown in the figure. The size of the target object 1 may be the size of the area 210.

In the determination of moving direction and speed information of a target object, the processor may first determine whether the target object exists in a previously captured panoramic video frame, for example, in the immediately previous video frame. In case of existence, the moving direction and speed of the target object can be determined based on multiple video frames.

S102, calculating position information for capturing of each of the target objects according to the first position information, moving direction and speed information of the target object, and a preset period for position adjustment of a detail camera.

In the embodiment of the present application, the position of the detail camera is adjustable. The position adjustment may take a period, which can be preset and stored in the processor.

It can be understood that, as position adjustment of the detail camera may take a period and the target object is moving at a speed, a target object's position in the current panoramic video frame may not be the position when it is captured by the detail camera.

After determining first position information, moving direction and speed information of a target object, the processor can calculate position information for capturing of the target object according to the first position information, moving direction and speed information of the target object, and a preset period for position adjustment of a detail camera. In other words, the position where the target object is captured in the panoramic video frame can be calculated.

For example, the processor may determine position change information of the target object according to the speed and moving direction thereof, and a preset period for position adjustment of the detail camera. Then, the position for capturing of the target object may be determined according to the first position information of the first object and corresponding position change.

S103, determining detail camera position information corresponding to each of the target objects according to the position information for capturing of the target object and pre-established position correspondences between the panoramic camera and the detail camera, and determining a magnification corresponding to each of the target objects according to the size of the target object.

In the embodiment of the present application, position correspondences between panoramic camera and detail camera can be established in advanced. For example, a position a1 of a target object in the panoramic video frame acquired by the panoramic camera corresponds to a position b1 of the detail camera; a position a2 of a target object in the panoramic video frame acquired by the panoramic camera corresponds to a position b2 of the detail camera. The position information of the detail camera may include horizontal and vertical positions.

After the processor determines the position for capturing of a target object, a position of the detail camera to capture the target object can be determined according to the position for capturing of the target object and the position correspondences between the panoramic camera and detail camera. In other words, the position of the detail camera where it is to capture the target object is determined.

For example, for a target object, the processor may look up for the position for capturing of the target object in the pre-established position correspondences between the panoramic camera and detail camera, and use a detail camera position corresponding to the position for capturing of the object as the position of the detail camera corresponding to the target object.

In the embodiment of the present application, in order to capture a clear image of the target object, the magnification of the detail camera can be adjusted. Specifically, the processor may determine a magnification corresponding to a target object according to the size of the target object.

Generally, the standard for recognizable details is that the pixel width of a person in an image reaches 240. According to this standard, the processor can determine magnifications corresponding to target objects of different sizes. For example, for a large target object, the magnification of the detail camera can be adjusted to a small value to capture the whole object. However, for a small target object, the magnification of the detail camera can be adjusted to a large value to obtain the largest target object that can be allowed, so as to increase the definition of the target object.

In an implementation, the processor may determine an angle of view for a target object according to the size thereof. As such, the processor may further determine a magnification corresponding to the angle of view angle according to preset correspondences between magnifications and angles of view, and use the determined magnification as the magnification corresponding to the target object.

S104, determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object.

In the embodiment of the present application, in order to improve the quality of a captured target object, the target object may be captured for multiple times. Specifically, the processor may determine a tracking duration for each target object before the capture thereof, and then may capture the target object for multiple times within the tracking duration of the target object.

For example, the processor may set a tracking duration for all the target objects, obtain the preset tracking duration before the capture of a target object, and use the obtained tracking duration as the tracking duration for the target object.

After the tracking duration, detail camera position and magnification corresponding to a target object are determined, the details of the target object can be captured. Specifically, the processor may, for each target object, control the detail camera to adjust its position and magnification according to the detail camera position information and magnification corresponding to the target object, and control the adjusted detail camera to capture the target object within the tracking duration for the target object.

For example, the processor may sequentially send a capturing instruction for each target object to the detail camera. The capturing instruction includes the detail camera position information and magnification corresponding to the target object. After receiving the capturing instruction, the detail camera can adjust its position and magnification according to the detail camera position and magnification contained therein, and capture the target object within the tracking duration for the target object. For example, for a target object, the detail camera can capture the target object according to a fixed capturing frequency within the tracking duration for the target object.

In the embodiment of the present application, when a target object acquired by the panoramic camera is detected, the detail camera can be adjusted to capture the target object by using a position and magnification corresponding to the target object according to the specific position, size, movement direction, and speed of the target object, and can capture the target object for multiple times within a capturing duration for the target object. As such, the quality of the captured target object is improved while a large monitoring range can be ensured.

In an implementation of the embodiment of the present application, in order to improve capturing efficiency of a target object, when the processor detects target objects in a current panoramic video frame, the processor may detect target objects that are present in the current panoramic video frame but are not present in a previous panoramic video frame captured by the panoramic camera.

It can be understood that the similarity of a same target object in adjacent panoramic video frames is generally high. Therefore, for a target object appearing in adjacent panoramic video frames, details of the target object can be captured only once. This improves the capturing efficiency of the target object.

In an implementation of the embodiment of the present application, in determination of the tracking duration of a target object, the processor may determine a distance of the target object from an edge of the monitoring scene according to the moving direction of the target object, and calculate a departure time of the target object according to the distance from the monitoring scene edge and the speed of the target object. The processor may then calculate the tracking duration of the target object according to the departure time of the target object and a preset condition. The preset condition may include: a sum of the tracking durations for target objects being less than the departure time of any target object, and having a maximum value, and the tracking durations for the target objects having a minimum variance.

Specifically, the processor can calculate the tracking duration $T_{k(i)}$ for a target object i by the following formula:

$$T_{l(n)} - \sum_{i=0}^{n} T_{k(i)} > 0$$

Wherein $T_{l(n)}$ is the departure time of any target object.
In addition, the following two conditions must be met:

$$\sum_{i=0}^{n} T_{k(i)}$$

is the maximum and $$\frac{1}{n}\sum_{i=0}^{n}(T_{k(i)} - \overline{T_{k(i)}})^2$$

is the minimum.

In other words, when determining tracking durations for target objects, it can be ensured that each target object can be allocated with a certain tracking duration, such that each target object can be captured. In addition, the tracking duration for each target object shall be as long as possible, and the difference between tracking durations for target objects shall be small to avoid local optimization.

In the embodiment of the present application, in order to further improve the quality of capture of a target object, the processor may determine capturing priorities of target objects, and then capture the target objects according to the priority order.

Specifically, the processor may determine capturing priorities of target objects according to a descending order of departure time of the target objects. In other words, the smaller the time a target object takes to depart, the higher priority the target object has.

Correspondingly, in capturing of target objects, for each of the target objects, the processor may control, in a descending order of the priorities, the detail camera to adjust its position and magnification according to the detail camera position information and the magnification corresponding to the target object, and control the adjusted detail camera to capture the target object within the tracking duration for the target object.

In the embodiments of the present application, capturing priorities of target objects can be determined according to departure time thereof. Target objects are captured according to the capturing priorities, so as to ensure the target objects are not at edge positions when being captured. This can improve the quality of captured target objects.

It can be understood that, in capturing of target objects, an object moving directly toward the panoramic camera may be captured with better quality. Therefore, in an implementation of the embodiment of the present application, in order to improve the quality and efficiency of capturing, before determining position information for capturing of target objects, the processor may identify, among all the target objects, first target objects that are moving directly toward the panoramic camera. For example, the processor may identify first target objects that are moving directly toward the panoramic camera according to the moving directions of target objects.

Correspondingly, after the first target objects are identified, the processor may only capture the first target object. Specifically, the processor may calculate position information for capturing of each of the first target objects according to first position information, a moving direction and speed information of the first target object, and a preset period for position adjustment of the detail camera. The processor may then determine detail camera position information corresponding to each of the first target objects according to the position information for capturing of the first target object and the pre-established position correspondences between the panoramic camera and the detail camera; and determine a magnification corresponding to each of the first target objects according to the size of the first target object. The processor may then determine a tracking duration for each of the first target objects. Then, the processor controls, for each of the first target objects, the detail camera to adjust its position and magnification according to the detail camera position information and magnification corresponding to the first target object, and controls the adjusted detail camera to capture the first target object within the tracking duration for the first target object.

In an implementation of the embodiment of the present application, after controlling the detail camera to capture a target object, the processor may also identify one or more high-quality images among images of the target object for storage. Further operations such as feature extraction can be performed on the stored image.

Specifically, the processor may obtain, for any of the target objects, multiple images of the target object captured by the detail camera, and then identify and store N images with the best image quality among the multiple images, where N is an integer greater than 0.

In an implementation of the embodiment of the present application, in order to improve capturing quality of a target object, the processor may perform block processing on target objects in the current panoramic video frame. As shown in FIG. 4, the process of capturing target objects by the processor may include the following steps:

S401, performing block processing on the target objects according to the detail camera position information and magnifications corresponding to the target objects to obtain at least one target block, wherein, each target block contains one or more target objects.

In the embodiment of the present application, the processor may perform block processing on the target objects according to the detail camera position information and magnifications corresponding to the target objects to obtain at least one target block. Each target block contains one or more target objects The detail camera corresponds to different position ranges at different magnifications. After the detail camera position information and the magnification corresponding to each of the target objects are obtained, all target objects whose magnifications are within a certain range of magnification (for example, 0.5 times) and that meet a position range of the detail camera are found and grouped into one block, so as to form finally different target blocks.

Figure 5:
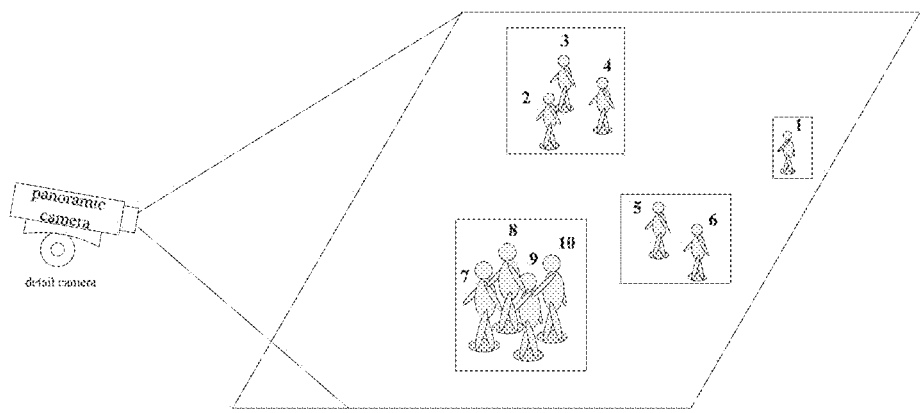
FIG. 5 is a schematic diagram of a result of dividing target objects into blocks according to an embodiment of the present application.

Referring to FIG. 5, after the block processing is performed on the target objects in the panoramic video frame shown in FIG. 2, each of the obtained target blocks may be as shown in FIG. 5. As shown in FIG. 5, all of the target objects may be divided into 4 blocks, with target objects 7, 8, 9, 10 as one block, target objects 2, 3, 4 as one block, target objects 5, 6 as one block, and target object 1 as one block.

S402, determining a tracking duration for each target block; for each target block, identifying, from target objects contained in the target block, second target objects at edge positions; and determining detail camera position information corresponding to the target block according to the detail camera position information corresponding to the second target objects, and determining a magnification corresponding to the target block according to magnifications corresponding to the second target objects.

After obtaining the target blocks, the processor can determine a tracking duration of each target block. Specifically, the processor may first determine, for each target block, third target objects with the same moving direction and of the largest amount according to moving directions of target objects contained in the target block, and then determine a distance of the target block from the monitoring scene edge according to the moving directions of the third target objects.

For example, in case where a target block contains 6 target objects, with 5 target objects moving directly toward the panoramic camera and the other target object moving away from the panoramic camera, the 5 target objects moving directly toward the panoramic camera may be determined as the third target objects. Further, the processor may determine the distance of the target block from an edge of the monitoring scene when the target block is moving in the moving direction of the third target objects.

Further, the processor may calculate a departure time for the target block according to the distance of the target block from the monitoring scene edge and an average speed of the third target objects contained in the target block. The processor may then calculate a tracking duration of the target block according to the departure time of the target block and a preset condition. The preset condition may include: the sum of the tracking durations of the target blocks being less than the departure time of any of the target blocks, and having a maximum value, and the tracking durations of the target blocks having a minimum variance.

For the process of determining the tracking duration of each target block by the processor, reference may be made to the process of determining the tracking duration of each target object, and details are not repeated herein.

In this embodiment, the processor may also, for each target block, identify second target objects at edge positions among the target objects contained in the target block.

Figure 6:
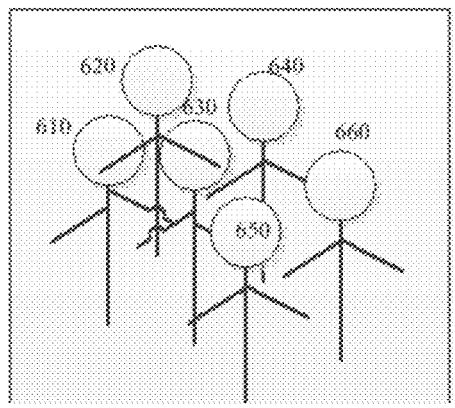
FIG. 6 is a schematic diagram of a result of determining second target objects in a target block according to an embodiment of the present application.

As shown in FIG. 6 that illustrates a schematic diagram of a target block containing multiple target objects. As shown in FIG. 6, for the target block, the processor can identify that the second target objects at edge positions are the target objects 610, 620, 650, and 660.

After identifying second target objects at edge positions in each target block, the processor may determine detail camera position information corresponding to the target block according to the detail camera position information corresponding to the second target objects, and determine a magnification corresponding to the target block according to magnifications corresponding to the second target objects.

For example, a maximum value in the magnifications corresponding to the second target objects may be used as the magnification corresponding to the target block, or a comprehensive magnification obtained by multiplying the magnification of each of the second target objects by a corresponding weight may be used as the magnification corresponding to the target block.

S403, for each target block, controlling the detail camera to adjust its position and magnification according to the detail camera position information and magnification corresponding to the target block, and controlling the adjusted detail camera to capture the target block within the tracking duration for the target block.

After obtaining the detail camera position information and magnification corresponding to each target block and the tracking duration for each target block, the processor can, for each target block, control the detail camera to adjust its position and magnification according to the detail camera position information and magnification corresponding to the target block, and control the adjusted detail camera to capture the target block within the tracking duration for the target block.

In this embodiment, the processor can perform block processing on target objects, and then capture the target blocks. In this way, capturing efficiency can be improved.

Figure 7:
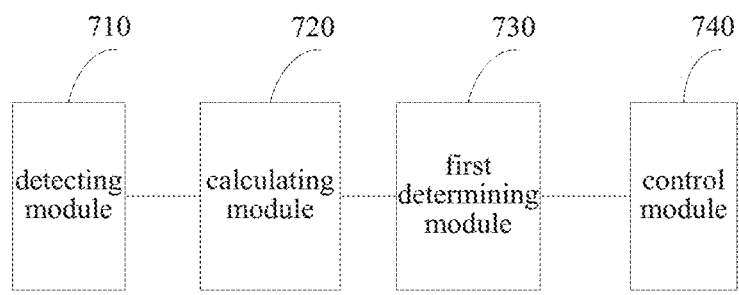
FIG. 7 is a schematic structural diagram of an apparatus for capturing a target object according to an embodiment of the present application.

Correspondingly, an embodiment of the present application further provides an apparatus for capturing a target object. As shown in FIG. 7, the apparatus includes:

a detecting module 710, configured for detecting target objects in a current panoramic video frame acquired by a panoramic camera, and determining first position information, a size, a moving direction, and speed information of each of the target objects in the current panoramic video frame;

a calculating module 720, configured for calculating position information for capturing of each of the target objects according to the first position information, moving direction and speed information of the target object, and a preset period for position adjustment of a detail camera;

a first determining module 730, configured for determining detail camera position information corresponding to each of the target objects according to the position information for capturing of the target object and pre-established position correspondences between the panoramic camera and the detail camera, and determining a magnification corresponding to each of the target objects according to the size of the target object; and a control module 740, configured for determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object.

In the embodiment of the present application, when a target object acquired by the panoramic camera is detected, the detail camera can be adjusted to capture the target object by using a position and magnification corresponding to the target object according to the specific position, size, movement direction, and speed of the target object, and can capture the target object for multiple times within a capturing duration for the target object. As such, the quality of the captured target object is improved while a large monitoring range can be ensured.

In an implementation of the embodiment of the present application, the calculating module 720 includes:

a first determining sub-module (not shown in the figures), configured for determining position change information of each of the target objects according to the speed information and moving direction of the target object, and the preset period for position adjustment of the detail camera; and a second determining sub-module (not shown in the figures), configured for determining the position information for capturing of each of the target objects according to the first position information of the target object and corresponding position change information.

In an implementation of the embodiment of the present application, the first determining module 730 includes:

a third determining sub-module (not shown in the figures), configured for determining an angle of view for each of the target objects according to the size of the target object;

a fourth determining sub-module (not shown in the figures), configured for determining a magnification corresponding to the angle of view according to preset correspondences between magnifications and angles of view, and using the determined magnification as the magnification corresponding to the target object.

In an implementation of the embodiment of the present application, the control module 740 includes:

a first calculating sub-module (not shown in the figures), configured for determining a distance of each of the target objects from a monitoring scene edge according to the moving direction of the target object, and calculating a departure time of each of the target objects according to the distance of the target object from the monitoring scene edge and the speed information of the target object;

a second calculating sub-module (not shown in the figures), configured for calculating the tracking duration for each of the target objects according to the departure time of the target object and a preset condition; wherein, the preset condition include: a sum of the tracking durations for the target objects being less than the departure time of any of the target objects and having a maximum value, and the tracking durations for the target objects having a minimum variance.

In an implementation of the embodiment of the present application, the apparatus further includes:

a second determining module (not shown in the figures) configured for determining a capturing priority of each of the target objects according to an ascending order of the departure time of the target objects.

The control module 740 is specifically configured for, for each of the target objects, controlling, in a descending order of the priorities, the detail camera to adjust its position and magnification according to the detail camera position information and the magnification corresponding to the target object, and controlling the adjusted detail camera to capture the target object within the tracking duration for the target object.

In an implementation of the embodiment of the present application, the control module 740 is specifically configured for obtaining a preset tracking duration, and taking the obtained tracking duration as the tracking duration for the target object.

In an implementation of the embodiment of the present application, the apparatus further includes:

an identifying module (not shown in the figures), configured for identifying, among the target objects, first target objects moving directly toward the panoramic camera.

Correspondingly, the calculating module 720 is configured for calculating position information for capturing of each of the first target objects according to first position information, a moving direction and speed information of the first target object, and a preset period for position adjustment of the detail camera;

The first determining module 730 is configured for determining detail camera position information corresponding to each of the first target objects according to the position information for capturing of the first target object and the pre-established position correspondences between the panoramic camera and the detail camera; and determining a magnification corresponding to each of the first target objects according to the size of the first target object.

The control module 740 is configured for determining a tracking duration for each of the first target objects, and controlling, for each of the first target objects, the detail camera to adjust its position and magnification according to the detail camera position information and magnification corresponding to the first target object, and controlling the adjusted detail camera to capture the first target object within the tracking duration for the first target object.

In an implementation of the embodiment of the present application, the apparatus further includes:

an obtaining module (not shown in the figures), configured for obtaining, for any of the target objects, multiple images of the target object captured by the detail camera; and a storage module (not shown in the figures), configured for identifying and storing N images with the best image quality among the multiple images, where N is an integer greater than 0.

In an implementation of the embodiment of the present application, the control module 740 includes a blocking sub-module (not shown in the figures), configured for performing block processing on the target objects according to the detail camera position information and magnifications corresponding to the target objects to obtain at least one target block, wherein, each target block contains one or more target objects;

a fifth determining sub-module (not shown in the figures), configured for determining a tracking duration for each target block; for each target block, identifying, from target objects contained in the target block, second target objects at edge positions; and determining detail camera position information corresponding to the target block according to the detail camera position information corresponding to the second target objects, and determining a magnification corresponding to the target block according to magnifications corresponding to the second target objects; and a control sub-module (not shown in the figures), configured, for each target block, controlling the detail camera to adjust its position and magnification according to the detail camera position information and magnification corresponding to the target block, and controlling the adjusted detail camera to capture the target block within the tracking duration for the target block.

In an implementation of the embodiment of the present application, the fifth determining sub-module includes:

a determining subunit (not shown in the figures), configured for determining, for each target block, third target objects with the same moving direction and of the largest amount according to moving directions of target objects contained in the target block, and determining a distance of the target block from the monitoring scene edge according to the moving directions of the third target objects;

a first calculating subunit (not shown in the figures), configured for calculating a departure time for the target block according to the distance of the target block from the monitoring scene edge and an average speed of the third target objects contained in the target block; and a second calculating subunit (not shown in the figures), configured for calculating a tracking duration of the target block according to the departure time of the target block and a preset condition; wherein the preset condition includes: the sum of the tracking durations of the target blocks being less than the departure time of any of the target blocks, and having a maximum value, and the tracking durations of the target blocks having a minimum variance.

In an implementation of the embodiment of the present application, the fifth determining sub-module is specifically configured for using a maximum value in the magnifications corresponding to the second target objects as the magnification corresponding to the target block, or using a comprehensive magnification obtained by multiplying the magnification of each of the second target objects by a corresponding weight as the magnification corresponding to the target block.

In an implementation of the embodiment of the present application, the detecting module 710 is specifically configured for detecting target objects that are in the current panoramic video frame but are not in a previous panoramic video frame captured by the panoramic camera.

Figure 8:
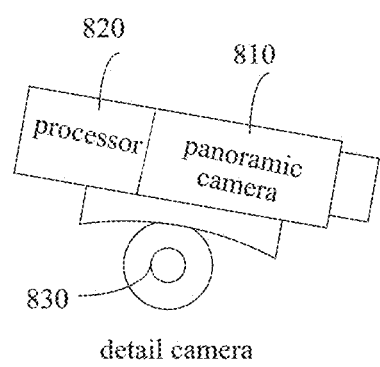
FIG. 8 is a schematic structural diagram of a video monitoring device according to an embodiment of the present application.

Correspondingly, an embodiment of the present application further provides a video monitoring device. As shown in FIG. 8, the video monitoring device includes a panoramic camera 810, a processor 820, and a detail camera 830.

The panoramic camera 810 is configured for capturing a current panoramic video frame and send the current panoramic video frame to the processor 820.

The processor 820 is configured for detecting target objects in the current panoramic video frame acquired by the panoramic camera, and determining first position information, a size, a moving direction, and speed information of each of the target objects in the current panoramic video frame; calculating position information for capturing of each of the target objects according to the first position information, moving direction and speed information of the target object, and a preset period for position adjustment of the detail camera; determining detail camera position information corresponding to each of the target objects according to the position information for capturing of the target object and pre-established position correspondences between the panoramic camera and the detail camera, and determining a magnification corresponding to each of the target objects according to the size of the target object; determining a tracking duration for each of the target objects; and for each of the target objects, sending the detail camera position information and magnification corresponding to the target object to the detail camera.

The detail camera 830 is configured for adjusting its position and magnification according to received detail camera position information and magnification corresponding to the target object, and capturing the target object within the tracking duration for the target object.

In the embodiment of the present application, when a target object acquired by the panoramic camera is detected, the detail camera can be adjusted to capture the target object by using a position and magnification corresponding to the target object according to the specific position, size, movement direction, and speed of the target object, and can capture the target object for multiple times within a capturing duration for the target object. As such, the quality of the captured target object is improved while a large monitoring range can be ensured.

In an implementation of the embodiment of the present application, the processor 820 is specifically configured for determining position change information of each of the target objects according to the speed information and moving direction of the target object, and the preset period for position adjustment of the detail camera; and determining the position information for capturing of each of the target objects according to the first position information of the target object and corresponding position change information.

In an implementation of the embodiment of the present application, the processor 820 is specifically configured for determining an angle of view for each of the target objects according to the size of the target object; and determining a magnification corresponding to the angle of view according to preset correspondences between magnifications and angles of view, and using the determined magnification as the magnification corresponding to the target object.

In an implementation of the embodiment of the present application, the processor 820 is specifically configured for determining a distance of each of the target objects from a monitoring scene edge according to the moving direction of the target object, and calculating a departure time of each of the target objects according to the distance of the target object from the monitoring scene edge and the speed information of the target object; and calculating the tracking duration for each of the target objects according to the departure time of the target object and a preset condition; wherein, the preset condition include: a sum of the tracking durations for the target objects being less than the departure time of any of the target objects and having a maximum value, and the tracking durations for the target objects having a minimum variance.

In an implementation of the embodiment of the present application, the processor 820 is specifically configured for, before controlling, for each of the target objects, the detail camera to adjust its position and magnification according to the detail camera position information and magnification corresponding to the target object, and controlling the adjusted detail camera to capture the target object within the tracking duration for the target object, determining a capturing priority of each of the target objects according to an ascending order of the departure time of the target objects.

The processor 820 is specifically configured for, for each of the target objects, sending, in a descending order of the priorities, the detail camera position information and magnification corresponding to the target object to the detail camera 830.

The detail camera 830 is specifically configured for adjusting its position and magnification according to the received detail camera position information and magnification corresponding to the target object and capturing the target object within the tracking duration for the target object.

In an implementation of the embodiment of the present application, the processor 820 is specifically configured for obtain a preset tracking duration, and use the obtained tracking duration as the tracking duration of each target object.

In an implementation of the embodiment of the present application, the processor 820 is specifically configured for, before calculating position information for capturing of each of the target objects according to the first position information, moving direction and speed information of the target object, and a preset period for position adjustment of a detail camera, identifying, among the target objects, first target objects moving directly toward the panoramic camera.

The processor 820 is specifically configured for calculating position information for capturing of each of the first target objects according to first position information, a moving direction and speed information of the first target object, and a preset period for position adjustment of the detail camera; determining detail camera position information corresponding to each of the first target objects according to the position information for capturing of the first target object and the pre-established position correspondences between the panoramic camera and the detail camera; and determining a magnification corresponding to each of the first target objects according to the size of the first target object; determining a tracking duration for each of the first target objects, and sending the detail camera position information and magnification corresponding to the first target object to the detail camera 830.

The detail camera 830 is configured for adjusting its position and magnification according to received detail camera position information and magnification corresponding to the first target object, and capturing the first target object within the tracking duration for the target object.

In an implementation of the embodiment of the present application, the processor 820 is further configured for obtain, for any target object, multiple images corresponding to the target object captured by the detail camera; identify and store N images with the best image quality among the multiple images, where N is an integer greater than 0.

In an implementation of the embodiment of the present application, the processor 820 is specifically configured for performing block processing on the target objects according to the detail camera position information and magnifications corresponding to the target objects to obtain at least one target block, wherein, each target block contains one or more target objects; determining a tracking duration for each target block; for each target block, identifying, from target objects contained in the target block, second target objects at edge positions; and determining detail camera position information corresponding to the target block according to the detail camera position information corresponding to the second target objects, and determining a magnification corresponding to the target block according to magnifications corresponding to the second target objects; and sending the detail camera position information and magnification corresponding to each target block to the detail camera 830.

The detail camera 830 is specifically configured for, for each target block, adjusting its position and magnification according to received detail camera position information and magnification corresponding to the target block, and capturing the target block within the tracking duration for the target block.

In an implementation of the embodiment of the present application, the processor 820 is specifically configured for determining, for each target block, third target objects with the same moving direction and of the largest amount according to moving directions of target objects contained in the target block, and determining a distance of the target block from the monitoring scene edge according to the moving directions of the third target objects; calculating a departure time for the target block according to the distance of the target block from the monitoring scene edge and an average speed of the third target objects contained in the target block; and calculating a tracking duration of the target block according to the departure time of the target block and a preset condition; wherein the preset condition includes: the sum of the tracking durations of the target blocks being less than the departure time of any of the target blocks, and having a maximum value, and the tracking durations of the target blocks having a minimum variance.

In an implementation of the embodiment of the present application, the processor 820 is specifically configured for using a maximum value in the magnifications corresponding to the second target objects as the magnification corresponding to the target block, or using a comprehensive magnification obtained by multiplying the magnification of each of the second target objects by a corresponding weight as the magnification corresponding to the target block.

In an implementation of the embodiment of the present application, the processor 820 is specifically configured for detecting target objects that are present in the current panoramic video frame but are not present in a previous panoramic video frame captured by the panoramic camera.

Correspondingly, an embodiment of the present application further provides a storage medium. The storage medium is used to store executable program codes. The executable program codes, when being executed, perform a method for capturing a target object of the embodiments of the present application. The method for capturing a target object includes:

detecting target objects in a current panoramic video frame acquired by a panoramic camera, and determining first position information, a size, a moving direction, and speed information of each of the target objects in the current panoramic video frame;

calculating position information for capturing of each of the target objects according to the first position information, moving direction and speed information of the target object, and a preset period for position adjustment of a detail camera;

determining detail camera position information corresponding to each of the target objects according to the position information for capturing of the target object and pre-established position correspondences between the panoramic camera and the detail camera, and determining a magnification corresponding to each of the target objects according to the size of the target object; and determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object.

In the embodiment of the present application, when a target object acquired by the panoramic camera is detected, the detail camera can be adjusted to capture the target object by using a position and magnification corresponding to the target object according to the specific position, size, movement direction, and speed of the target object, and can capture the target object for multiple times within a capturing duration for the target object. As such, the quality of the captured target object is improved while a large monitoring range can be ensured.

Correspondingly, an embodiment of the present application further provides an application program. The application program, when being executed, performs a method for capturing a target object of the embodiments of the present application. The method for capturing a target object includes:

detecting target objects in a current panoramic video frame acquired by a panoramic camera, and determining first position information, a size, a moving direction, and speed information of each of the target objects in the current panoramic video frame;

calculating position information for capturing of each of the target objects according to the first position information, moving direction and speed information of the target object, and a preset period for position adjustment of a detail camera;

determining detail camera position information corresponding to each of the target objects according to the position information for capturing of the target object and pre-established position correspondences between the panoramic camera and the detail camera, and determining a magnification corresponding to each of the target objects according to the size of the target object; and determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object.

In the embodiment of the present application, when a target object acquired by the panoramic camera is detected, the detail camera can be adjusted to capture the target object by using a position and magnification corresponding to the target object according to the specific position, size, movement direction, and speed of the target object, and can capture the target object for multiple times within a capturing duration for the target object. As such, the quality of the captured target object is improved while a large monitoring range can be ensured.

For the embodiments of the device, video monitoring device, the storage medium and the application program, since they are basically similar to the method embodiments, the description is relatively simple, and the relevant parts can be referred to the description of the method embodiments.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices including a series of elements include not only those elements, but also other elements not specified or the elements inherent to those processes, methods, objects, or devices. Without further limitations, an element limited by the phrase "include(s) a . . . " do not exclude that there are other identical elements in the processes, methods, objects, or devices that include that element.

Each embodiment in this specification is described in a related manner, and the same or similar parts between the various embodiments can be referred to each other. Each embodiment focuses on the differences from other embodiments. In particular, as for the device embodiment, since it is basically similar to the method embodiment, the description is relatively simple, and the relevant part may refer to the description of the method embodiment.

Those of ordinary skill in the art can understand that all or part of the steps in the foregoing method embodiments can be implemented by a program instructing related hardware, and the program can be stored in a computer-readable storage medium, referred herein as storage media, such as: ROM/RAM, magnetic disks, compact discs, etc.

The above descriptions are merely preferred embodiments of the present application, and are not intended to limit the protection scope of the present application. Any modification, equivalent replacement, and improvement made within the spirit and principle of this application fall within the protection scope of this application.

The invention claimed is:

1. A method for capturing a target object, comprising:
   detecting target objects in a current panoramic video frame acquired by a panoramic camera, and determining first position information, a size, a moving direction, and speed information of each of the target objects in the current panoramic video frame;
   calculating position information for capturing of each of the target objects according to the first position information, moving directions and speed information of the target objects, and a preset period for position adjustment of a detail camera;
   determining detail camera position information corresponding to each of the target objects according to the position information for capturing of the target object and pre-established position correspondences between the panoramic camera and the detail camera, and determining a magnification corresponding to each of the target objects according to the size of the target object; and
   determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object.

2. The method according to claim 1, wherein, calculating position information for capturing of each of the target objects according to the first position information, moving direction and speed information of the target object, and a preset period for position adjustment of a detail camera comprises:
   determining position change information of each of the target objects according to the speed information and moving direction of the target object, and the preset period for position adjustment of the detail camera; and
   determining the position information for capturing of each of the target objects according to the first position information of the target object and corresponding position change information.

3. The method according to claim 1, wherein, determining a magnification corresponding to each of the target objects according to the size of the target object comprises:
   determining an angle of view for each of the target objects according to the size of the target object;
   determining a magnification corresponding to the angle of view according to preset correspondences between magnifications and angles of view, and using the determined magnification as the magnification corresponding to the target object.

4. The method according to claim 1, wherein, determining a tracking duration for each of the target objects comprises:
   determining a distance of each of the target objects from a monitoring scene edge according to the moving direction of the target object, and calculating a departure time of each of the target objects according to the distance of the target object from the monitoring scene edge and the speed information of the target object; and
   calculating the tracking duration for each of the target objects according to the departure time of the target object and a preset condition; wherein, the preset condition comprise: a sum of the tracking durations for the target objects being less than the departure time of any of the target objects and the sum of the tracking durations having a maximum value, and the tracking durations for the target objects having a minimum variance.

5. The method according to claim 4, wherein, before controlling, for each of the target objects, the detail camera to adjust its position and magnification according to the detail camera position information and magnification corresponding to the target object, and controlling the adjusted detail camera to capture the target object within the tracking duration for the target object, the method further comprises:
   determining a capturing priority of each of the target objects according to an ascending order of the departure time of the target objects;
   controlling, for each of the target objects, the detail camera to adjust its position and magnification according to the detail camera position information and magnification corresponding to the target object, and controlling the adjusted detail camera to capture the target object within the tracking duration for the target object comprises:
   for each of the target objects, controlling, in a descending order of the priorities, the detail camera to adjust its position and magnification according to the detail camera position information and the magnification corresponding to the target object, and controlling the adjusted detail camera to capture the target object within the tracking duration for the target object.

6. The method according to claim 1, wherein, determining a tracking duration for each of the target objects comprises:
   taking a preset tracking duration as the tracking duration for the target object;
   or wherein,
   the method further comprise:
   obtaining, for any of the target objects, multiple images of the target object captured by the detail camera; and
   identifying and storing N images with the best image quality among the multiple images, where N is an integer greater than 0;

or wherein,
detecting the target objects in a current panoramic video frame captured by a panoramic camera comprises:
detecting target objects that are in the current panoramic video frame but are not in a previous panoramic video frame captured by the panoramic camera.

7. The method according to claim 1, wherein, before calculating position information for capturing of each of the target objects according to the first position information, moving direction and speed information of the target object, and a preset period for position adjustment of a detail camera, the method further comprises:
identifying, among the target objects, first target objects moving directly toward the panoramic camera;
correspondingly, the steps of:
calculating position information for capturing of each of the target objects according to the first position information, moving directions and speed information of the target objects, and a preset period for position adjustment of a detail camera;
determining detail camera position information corresponding to each of the target objects according to the position information for capturing of the target object and pre-established position correspondences between the panoramic camera and the detail camera, and determining a magnification corresponding to each of the target objects according to the size of the target object; and
determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object comprise:
calculating position information for capturing of each of the first target objects according to first position information, a moving direction and speed information of the first target object, and a preset period for position adjustment of the detail camera;
determining detail camera position information corresponding to each of the first target objects according to the position information for capturing of the first target object and the pre-established position correspondences between the panoramic camera and the detail camera; and determining a magnification corresponding to each of the first target objects according to the size of the first target object; and
determining a tracking duration for each of the first target objects, and controlling, for each of the first target objects, the detail camera to adjust its position and magnification according to the detail camera position information and magnification corresponding to the first target object, and controlling the adjusted detail camera to capture the first target object within the tracking duration for the first target object.

8. The method according to claim 1, wherein, determining a tracking duration for each of the target objects, and controlling, for each of the target objects, the detail camera to adjust its position and magnification according to the detail camera position information and magnification corresponding to the target object, and controlling the adjusted detail camera to capture the target object within the tracking duration for the target object comprises:
performing block processing on the target objects according to the detail camera position information and magnifications corresponding to the target objects to obtain at least one target block, wherein, each target block contains one or more target objects;
determining a tracking duration for each target block;
identifying, from target objects contained in each target block, second target objects at edge positions; and determining detail camera position information corresponding to each target block according to the detail camera position information corresponding to the second target objects, and determining a magnification corresponding to each target block according to magnifications corresponding to the second target objects; and
controlling the detail camera to adjust its position and magnification according to the detail camera position information and magnification corresponding to each target block, and controlling the adjusted detail camera to capture each target block within the tracking duration for the target block.

9. The method according to claim 8, wherein, determining a tracking duration for each target block comprises:
determining, for each target block, third target objects with the same moving direction as each other and of the largest amount according to moving directions of target objects contained in the target block, and determining a distance of the target block from the monitoring scene edge according to the moving directions of the third target objects;
calculating a departure time for the target block according to the distance of the target block from the monitoring scene edge and an average speed of the third target objects contained in the target block; and
calculating a tracking duration of the target block according to the departure time of the target block and a preset condition; wherein the preset condition comprises: the sum of the tracking durations of the target blocks being less than the departure time of any of the target blocks, and the sum of the tracking durations having a maximum value, and the tracking durations of the target blocks having a minimum variance.

10. The method according to claim 8, wherein, determining a magnification corresponding to the target block according to magnifications corresponding to the second target objects comprises:
using a maximum value in the magnifications corresponding to the second target objects as the magnification corresponding to the target block, or using a comprehensive magnification obtained by multiplying the magnification of each of the second target objects by a corresponding weight as the magnification corresponding to the target block.

11. A video monitoring device, comprising a panoramic camera, a processor, and a detail camera;
the panoramic camera is configured for capturing a current panoramic video frame and send the current panoramic video frame to the processor;
the processor is configured for detecting target objects in the current panoramic video frame acquired by the panoramic camera, and determining first position information, a size, a moving direction, and speed information of each of the target objects in the current panoramic video frame; calculating position information for capturing of each of the target objects according to the first position information, moving directions and speed information of the target objects, and a preset period for position adjustment of the detail camera; determining detail camera position information corresponding to each of the target objects according to the position information for capturing of the target object and pre-established position correspondences between the panoramic camera and the detail camera, and determining a magnification corresponding to each of the target objects according to the size of the target object; determining a tracking duration for each of the target objects; and for each of the target objects, sending the detail camera position information and magnification corresponding to the target object to the detail camera; and the detail camera is configured for adjusting its position and magnification according to received detail camera position information and magnification corresponding to the target object, and capturing the target object within the tracking duration for the target object.

12. The device according to claim 11, wherein, the processor is further configured for determining position change information of each of the target objects according to the speed information and moving direction of the target object, and the preset period for position adjustment of the detail camera; and determining the position information for capturing of each of the target objects according to the first position information of the target object and corresponding position change information.

13. The device according to claim 11, wherein, the processor is further configured for determining an angle of view for each of the target objects according to the size of the target object; and determining a magnification corresponding to the angle of view according to preset correspondences between magnifications and angles of view, and using the determined magnification as the magnification corresponding to the target object.

14. The device according to claim 11, wherein, the processor is further configured for determining a distance of each of the target objects from a monitoring scene edge according to the moving direction of the target object, and calculating a departure time of each of the target objects according to the distance of the target object from the monitoring scene edge and the speed information of the target object; and calculating the tracking duration for each of the target objects according to the departure time of the target object and a preset condition; wherein, the preset condition comprise: a sum of the tracking durations for the target objects being less than the departure time of any of the target objects and the sum of the tracking durations having a maximum value, and the tracking durations for the target objects having a minimum variance.

15. The device according to claim 14, wherein, the processor is further configured for, before controlling, for each of the target objects, the detail camera to adjust its position and magnification according to the detail camera position information and magnification corresponding to the target object, and controlling the adjusted detail camera to capture the target object within the tracking duration for the target object, determining a capturing priority of each of the target objects according to an ascending order of the departure time of the target objects; and for each of the target objects, sending, in a descending order of the priorities, the detail camera position information and magnification corresponding to the target object to the detail camera;

the detail camera is further configured for adjusting its position and magnification according to the received detail camera position information and magnification corresponding to the target object and capturing the target object within the tracking duration for the target object.

16. The device according to claim 11, wherein, the processor is further configured for, before calculating position information for capturing of each of the target objects according to the first position information, moving direction and speed information of the target object, and a preset period for position adjustment of a detail camera, identifying, among the target objects, first target objects moving directly toward the panoramic camera; and the processor is further configured for: calculating position information for capturing of each of the first target objects according to first position information, a moving direction and speed information of the first target object, and a preset period for position adjustment of the detail camera; determining detail camera position information corresponding to each of the first target objects according to the position information for capturing of the first target object and the pre-established position correspondences between the panoramic camera and the detail camera; and determining a magnification corresponding to each of the first target objects according to the size of the first target object; determining a tracking duration for each of the first target objects, and sending the detail camera position information and magnification corresponding to the first target object to the detail camera;

the detail camera is configured for adjusting its position and magnification according to received detail camera position information and magnification corresponding to the first target object, and capturing the first target object within the tracking duration for the target object.

17. The device according to claim 11, wherein, the processor is further configured for performing block processing on the target objects according to the detail camera position information and magnifications corresponding to the target objects to obtain at least one target block, wherein, each target block contains one or more target objects;

determining a tracking duration for each target block; identifying, from target objects contained in each target block, second target objects at edge positions; and determining detail camera position information corresponding to each target block according to the detail camera position information corresponding to the second target objects, and determining a magnification corresponding to each target block according to magnifications corresponding to the second target objects; and sending the detail camera position information and magnification corresponding to each target block to the detail camera;

the detail camera is further configured for, adjusting its position and magnification according to received detail camera position information and magnification corresponding to each target block, and capturing each target block within the tracking duration for the target block.

18. The device according to claim 17, wherein, the processor is further configured for determining, for each target block, third target objects with the same moving direction as each other and of the largest amount according to moving directions of target objects contained in the target block, and determining a distance of the target block from the monitoring scene edge according to the moving directions of the third target objects; calculating a departure time for the target block according to the distance of the target block from the monitoring scene edge and an average speed of the third target objects contained in the target block; and calculating a tracking duration of the target block according to the departure time of the target block and a preset condition; wherein the preset condition comprises: the sum of the tracking durations of the target blocks being less than the departure time of any of the target blocks, and the sum of the tracking durations having a maximum value, and the tracking durations of the target blocks having a minimum variance.

19. The device according to claim 17, wherein, the processor is further configured for using a maximum value in the magnifications corresponding to the second target objects as the magnification corresponding to the target block, or using a comprehensive magnification obtained by multiplying the magnification of each of the second target objects by a corresponding weight as the magnification corresponding to the target block.

20. A non-transitory storage medium having executable program stored thereon which, when executed, performs the method for capturing a target object according to claim 1.

* * * * *